US010267498B2

(12) United States Patent
Carroll

(10) Patent No.: US 10,267,498 B2
(45) Date of Patent: Apr. 23, 2019

(54) LIGHT AND MOUNT ASSEMBLY

(71) Applicant: NITERIDER TECHNICAL LIGHTING & VIDEO SYSTEMS, INC., San Diego, CA (US)

(72) Inventor: Thomas Edward Carroll, San Diego, CA (US)

(73) Assignee: NITERIDER TECHNICAL LIGHTING & VDEO SYSTEMS, INC., San Diego, CA (US)

( * ) Notice: Subject to any disclaimer, the term of this patent is extended or adjusted under 35 U.S.C. 154(b) by 321 days.

(21) Appl. No.: 15/261,622

(22) Filed: Sep. 9, 2016

(65) Prior Publication Data

US 2018/0128459 A1  May 10, 2018

(51) Int. Cl.
| F21V 21/08 | (2006.01) |
| F21L 4/04 | (2006.01) |
| F21V 21/30 | (2006.01) |
| B62J 6/00 | (2006.01) |
| A42B 3/04 | (2006.01) |
| F21Y 115/10 | (2016.01) |

(52) U.S. Cl.
CPC ............. *F21V 21/08* (2013.01); *F21L 4/04* (2013.01); *A42B 3/044* (2013.01); *B62J 6/00* (2013.01); *F21V 21/30* (2013.01); *F21Y 2115/10* (2016.08)

(58) Field of Classification Search
CPC  F16B 5/0052; F16B 5/008; F16B 2005/0671; F16B 3/00; F16B 21/02

USPC .......................................................... 362/427
See application file for complete search history.

(56) References Cited

U.S. PATENT DOCUMENTS

| 5,477,425 | A | 12/1995 | Sun et al. |
| 6,152,582 | A * | 11/2000 | Klaus ..................... F21S 8/088 |
| | | | 362/363 |
| D566,871 | S | 4/2008 | Kumthampinij et al. |
| 7,425,082 | B1 | 9/2008 | Jones |
| 7,513,051 | B2 | 4/2009 | Spanski et al. |
| 8,172,436 | B2 | 5/2012 | Coleman et al. |
| 8,226,281 | B2 | 7/2012 | Wei |
| 8,733,989 | B1 | 5/2014 | Lo et al. |
| 2002/0197899 | A1 * | 12/2002 | Cykon .................. H01R 43/18 |
| | | | 439/320 |
| 2005/0121912 | A1 * | 6/2005 | Benscoter ........ F02M 35/10144 |
| | | | 285/401 |
| 2015/0208749 | A1 | 7/2015 | Carroll |
| 2015/0338071 | A1 * | 11/2015 | Feit ......................... F21V 21/04 |
| | | | 362/370 |

* cited by examiner

*Primary Examiner* — Christopher M Raabe
(74) *Attorney, Agent, or Firm* — David Duckworth

(57) ABSTRACT

A light and mount assembly is provided which includes a light, a base plate and a mounting plate. The base plate includes a bottom surface for affixing to an object and a top surface having a cavity with a circular rim having a plurality of indents. The mounting plate has a round bottom except for a plurality of radially extending flanges. The mounting plate's round bottom and flanges are sized and position to be insertable and removable to and from the base plate's circular opening and indents. Rotation of the mounting plate locks the mounting plate to the base plate. A light is pivotally affixed to the mounting plate.

4 Claims, 10 Drawing Sheets

LIGHT AND MOUNT ASSEMBLY

BACKGROUND OF THE INVENTION

The present invention relates to light assemblies. More specifically, the present invention relates to light and mount assemblies for affixing a light, such as a flashlight, to objects such as helmets or bicycles.

Light assemblies, also referred herein simply as lights, typically include a light source such as an incandescent bulb and/or a light emitting diode (LED). A light assembly also includes a power source such as a battery, and a switching assembly such as an on/off switch. Typical light assemblies include portable battery operated flashlights which are used extensively in society. These lights can be carried by hand, or mounted to an object such as to a helmet to provide a helmet light or to a bicycle to provide a bicycle light.

Light assemblies are mounted to objects utilizing a wide variety of mounting assemblies. For example, U.S. Pat. No. 5,477,425 discloses a mount for affixing a bicycle lamp to a bicycle. The mount includes a coupling disc which includes a tab for affixing to a mounting block. Similarly, U.S. Pat. No. 7,425,082 discloses a mount assembly for a flashlight. The mount assembly includes a clip and a base. The clip can affix to a wide variety of objects having a thin profile. Meanwhile, the base includes a post for holding the light which allows the light to be rotated or pivoted. U.S. Pat. No. 8,172,436 utilizes magnets for affixing a mount to metal objects. Moreover, U.S. Patent Publication No. 2015/0208749 discloses a helmet mount including three prongs for affixing to the chin strap of a helmet.

Unfortunately, each of the aforementioned mounting apparatus suffers from significant drawbacks. Some of the prior art constructions do not enable one to quickly and easily disengage a light from an object, and quickly and easily reattach the light for future use. Alternatively, mounting apparatus allow one to engage and disengage a light from an object, but the mounting assembly is structurally unsound causing the light to be easily disengaged when not intended.

Thus, there is a significant need for an improved light and mount assembly which is structurally stable so as to minimize any vibration to the light, and which is not prone to allow the light to unintentionally disengage from an object.

There is also a need for a light and mount assembly that enables one to quickly and easily engage and disengage a light from an object.

Further, there is also a need for a light and mount assembly that enables one to adjust the light into various positions.

SUMMARY OF THE INVENTION

The light and mount assembly of the present assembly includes three primary components, namely a base plate, a mounting plate and a light source. The base plate has a top and a bottom. The base plate's bottom is constructed to engage and affix to an underlying object. To this end, the bottom may be planar to affix to a flat surface. Alternatively, the base plate may have a slightly curved structure so as to affix to curved surfaces such as to the curved exterior of a helmet. Alternatively, the base plate's bottom may have a significantly arcuate bottom so as to affix to arcuate structures such as the frame of a bicycle. Preferably, the base plate includes an integrated fastener for affixing to an underlying object. The integrated fastener can be any type of traditional fastener as can be selected by those skilled in the art including hook and pile constructions, clamps, screws, nuts and bolts, straps, or magnets. In a preferred embodiment, the fastener is an adhesive or an adhesive pad which may be covered prior to affixing the base plate to an object by a removable liner. Still other fasteners can be selected by those skilled in the art.

The base plate further includes a cavity which is formed into the base plate's top surface. The base plate's top surface extends partially over the cavity to form a rim which surrounds the base plate's cavity to form a circular opening. For reasons explained in greater detail below, the rim has at least two indents which project radially outward from the circular opening.

Meanwhile, the light and mount assembly's mounting plate is selectively engagable and disengagable to and from the base plate. The mounting plate also has a top and a bottom. The mounting plate's bottom is constructed so as to engage and affix to the base plate's top. To this end, the mounting plate's bottom is round and has a diameter the same, or slightly smaller, than the base plate's circular opening, so as to be capable of projecting into the base plate's circular opening. Moreover, the mounting plate includes at least two flanges which project radially outward from the mounting plate's round bottom. The two or more flanges are sized and positioned so as to slide through the base plate's two or more indents when the mounting plate's bottom is inserted into the base plate's circular opening.

The mounting plate's flanges and base plate's indents are "keyed" to each other. The term "keyed" is meant to mean that the mounting plate's round bottom can only be inserted into the base plate's circular opening at only one rotational alignment between the two. More specifically, the mounting plate's flanges and base plate's indents are keyed so as to permit the base plate and mounting plate to convert from a disengaged condition to an engaged condition wherein the flanges are sized and positioned to be inserted into and travel through the indents in only one position relative to one another.

Meanwhile, the base plate's cavity is sufficiently large and deep so as to permit the mounting plate's two or more flanges to enter into the cavity beyond the edge of the base plate's circular rim. Once the flanges are within the base plate's cavity, with the flanges positioned interior of the base plate's circular rim, the mounting plate is capable of rotating 360° relative to the base plate so as to rotate the mounting plate's flanges below the base plate's rim so as to axially lock the base plate to the mounting plate. Once the base plate and mounting plate are locked together, they are disengagable only after the mounting plate has been rotated relative to the base plate so as to once again align the mounting plate's flanges to the one position wherein the mounting plate's flanges align with the base plate's indents. Thereafter, the mounting plate can be disengaged from the base plate by pulling the mounting plate and base plate apart whereupon the mounting plate's flanges will pass through the base plate's indents.

The mounting plate's flanges can be keyed to the base plate's indents so as to align in only one rotational position by numerous constructions. In a first preferred embodiment, the base plate includes at least two indents wherein a first indent is larger than a second indent, and the mounting plate includes at least two flanges wherein a first flange is larger than the second flange. The first larger flange is aligned to insert into the first larger indent, and the second smaller flange is aligned to insert into the second smaller indent. For this embodiment, the first larger flange is sized so as to be too large to fit into the second smaller indent so that the flanges can pass through the indents in only one position relative to each other to create a "keyed" engagement and disengagement.

In an alternative "keyed" embodiment, the flanges are the same size as the indents. However, the indents are not positioned at uniformed increments around the base plate's circular rim, and the mounting plate's flanges are correspondingly not spaced at uniformed increments around the mounting plate's bottom so that the base plate and mounting plate can engage and disengage from one another in only one rotational alignment so as to create a "keyed" engagement and disengagement. For example, where a base plate rim has two indents for accepting a mounting plate bottom's two flanges, the indents are not positioned at 180° to one another so that the base plate and mounting plate can engage and disengage from one another in only one rotational alignment. Similarly, where a base plate rim has three indents for accepting a mounting plate's bottom's three flanges, the flanges and indents are not positioned at 120° to one another.

The light and mount assembly further includes a light source affixed to the mounting plate's top surface. The light source may be affixed to the mounting plate by various fasteners that can be determined by those skilled in the art. For example, the mounting plate may simply include a housing within which the light source is located. However preferably, the light source is affixed to the mounting plate by a hinged assembly which allows the light source to rotate relative to the mounting plate. Preferably, the hinged assembly permits the light source to be rotatable about an axis of rotation that is aligned 90° relative to the axis of rotation about which the mounting plate rotates relative to the base plate. Preferably, the hinged assembly includes a U-shaped member having a central channel which extends upwardly from the mounting plate's top surface. The hinged assembly further includes a shaft which extends laterally from one upper edge of the U-shaped member to the other upper end of the U-shaped member. Furthermore, the hinged assembly includes a projection which projects downwardly from the light source's bottom. The projection has a hole for receiving and rotating about the hinged assembly's shaft. Preferably, the hinge assembly projection and light source are capable of rotating about the shaft which is aligned 90° relative to the axis about which the mounting plate rotates relative to the base plate.

Advantageously, the light and mount assembly provides a construction which enables one to firmly affix a light source to an underlying object.

Furthermore, the light and mount assembly permits the light source to be engaged and disengaged quickly from an object.

In addition, the mounting assembly enables the light source to be rotated about two axis of a rotation with one axis 90° relative to the other.

Other features and advantages of the present invention will be appreciated by those skilled in the art upon reading the detailed description which follows with reference to the attached drawings.

DETAILED DESCRIPTION OF THE INVENTION

Figure 1:
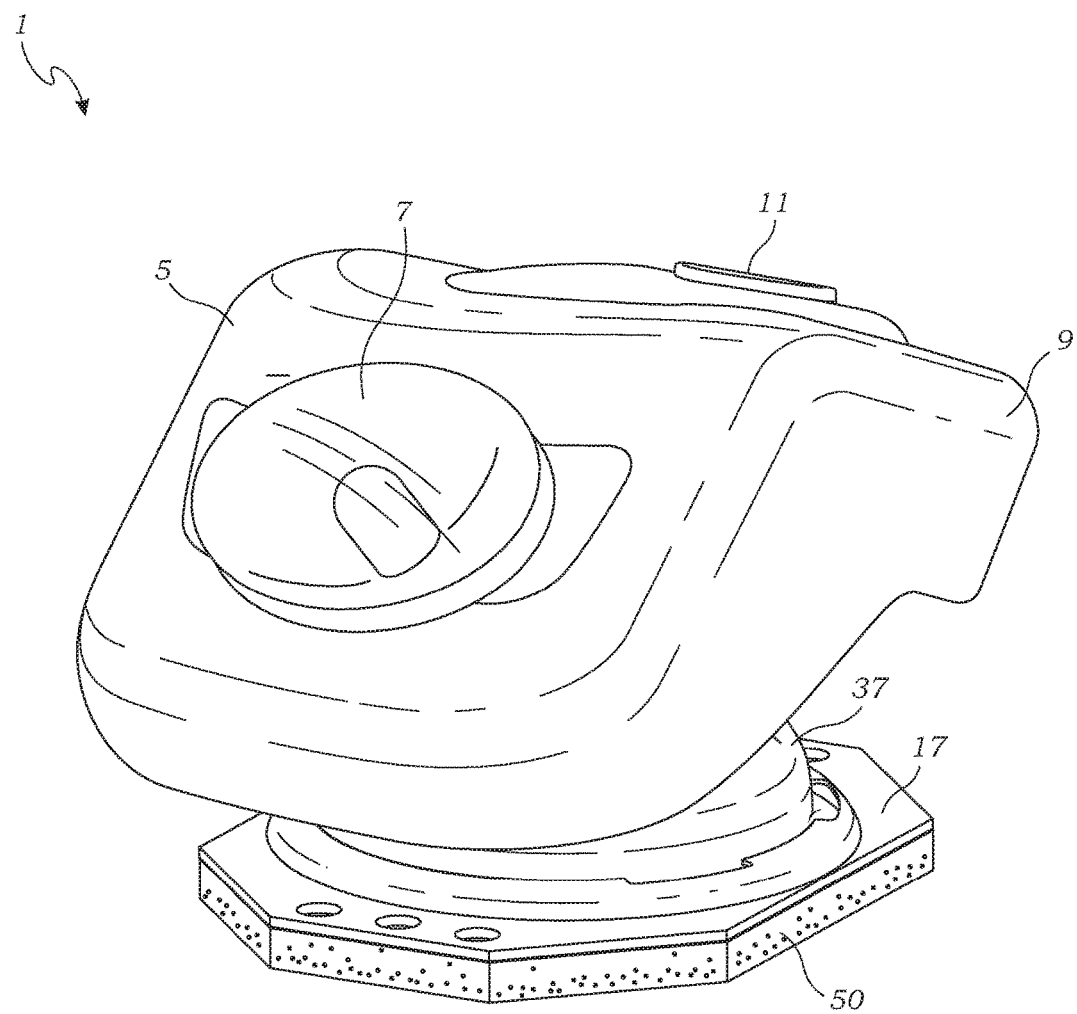
FIG. 1 is a right front perspective view of a preferred light and mount assembly of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to the figures, the light and mount assembly 1 includes a traditional light 5 such as a miniature flashlight which includes one or more light sources such as incandescent bulbs or light emitting diodes. The light source 7 is positioned within the light's housing 9 and the light source may be controlled by a switch 11.

The light 5 is affixed to the mounting plate 37. The mounting plate 37 has a top 39 and a bottom 41 which is round except for two or more flanges 43 which project radially outward from the mounting plate's bottom 41. The mounting plate 41 may include any number of flanges 43. However, as explained in greater detail below, preferably the mounting plate includes at least two flanges including a small flange 43a and a large flange 43b.

Figure 2:
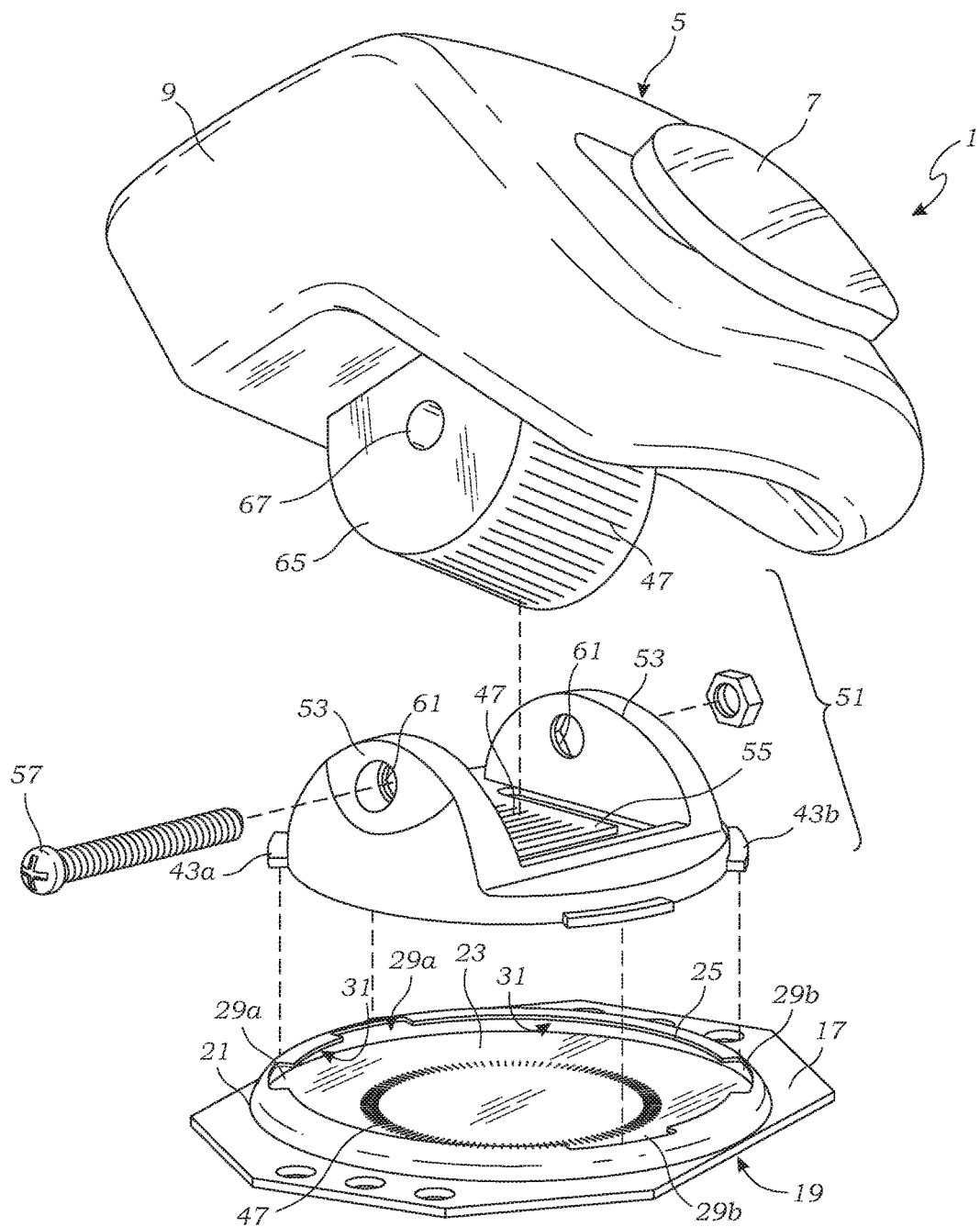
FIG. 2 is a left front exploded perspective view of a preferred light and mount assembly.
Figure 3:
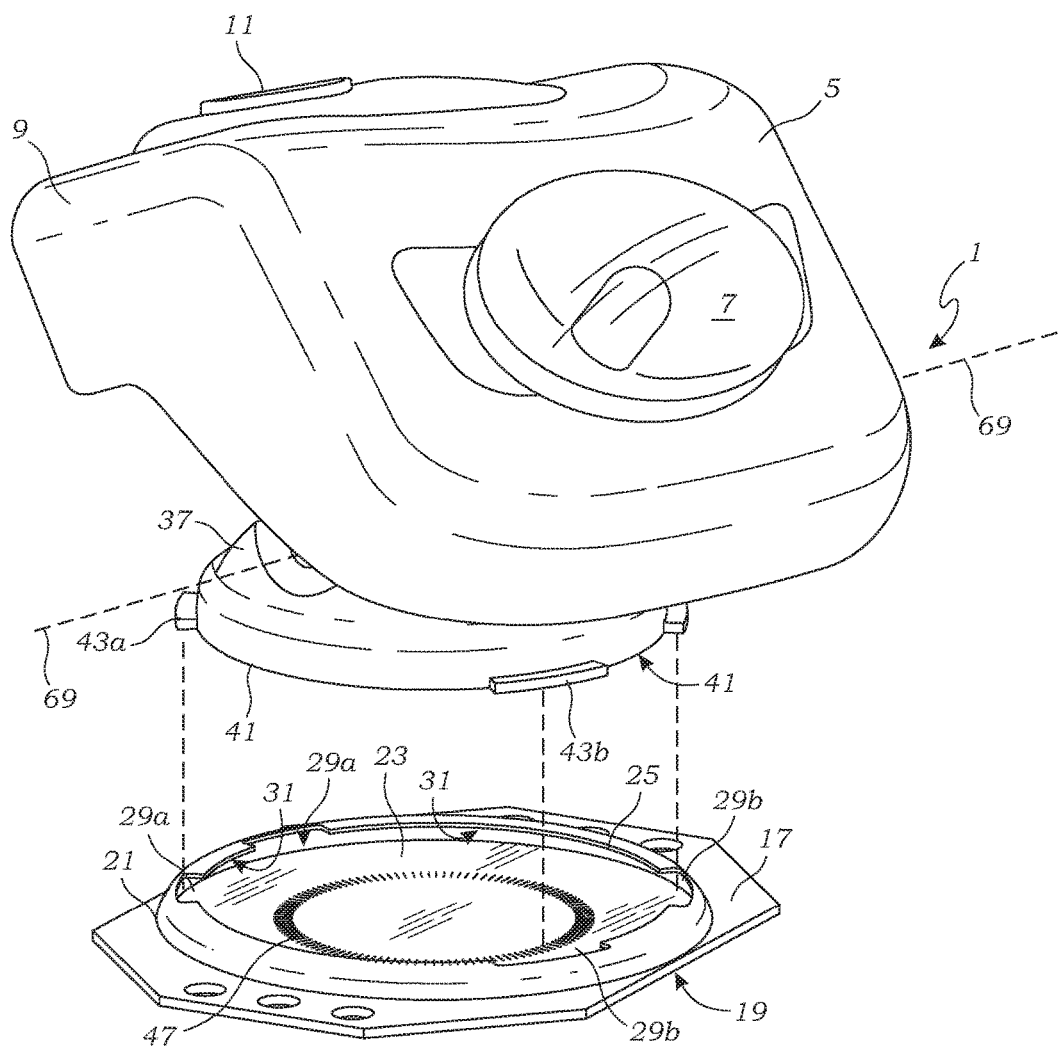
FIG. 3 is a partially exploded perspective view of a preferred light and mount assembly.
Figure 8:
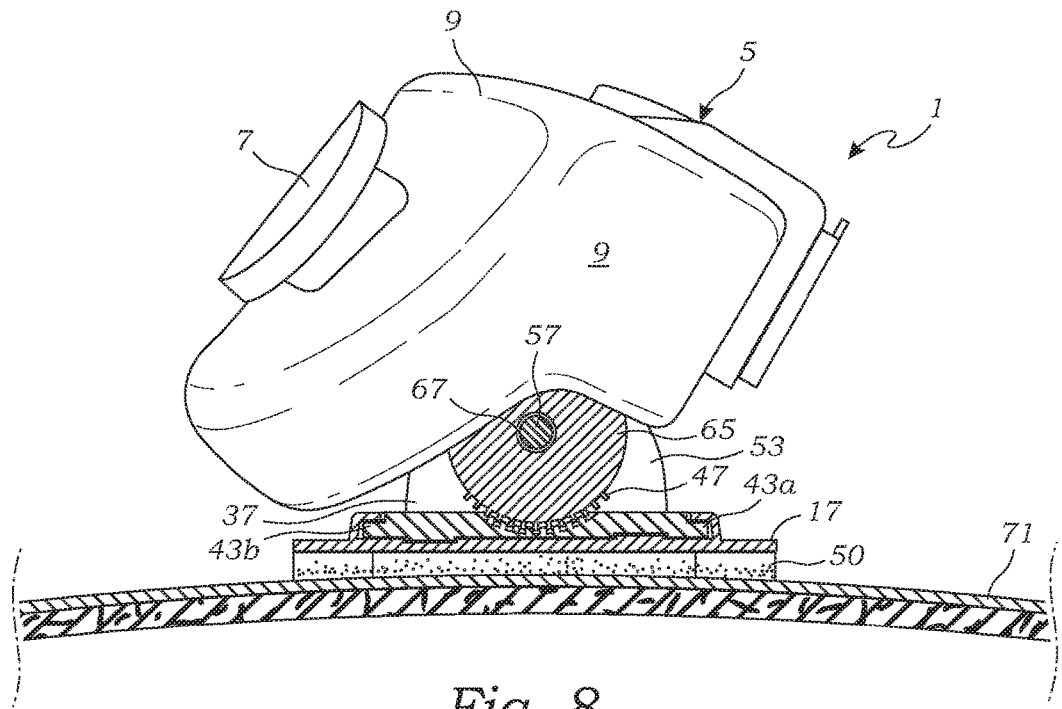
FIG. 8 is a side cutaway view illustrating a light and mount assembly.
Figure 9:
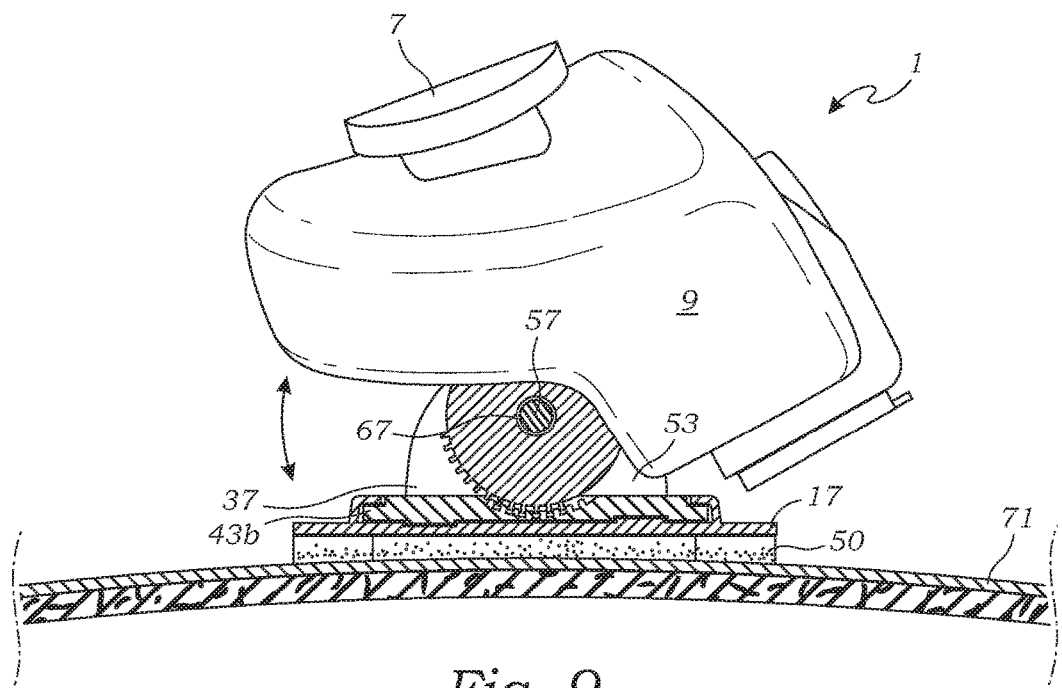
FIG. 9 is a side cutaway view of a light and mount assembly of FIG. 8 wherein the light has been pivoted relative to the base plate.
Figure 10:
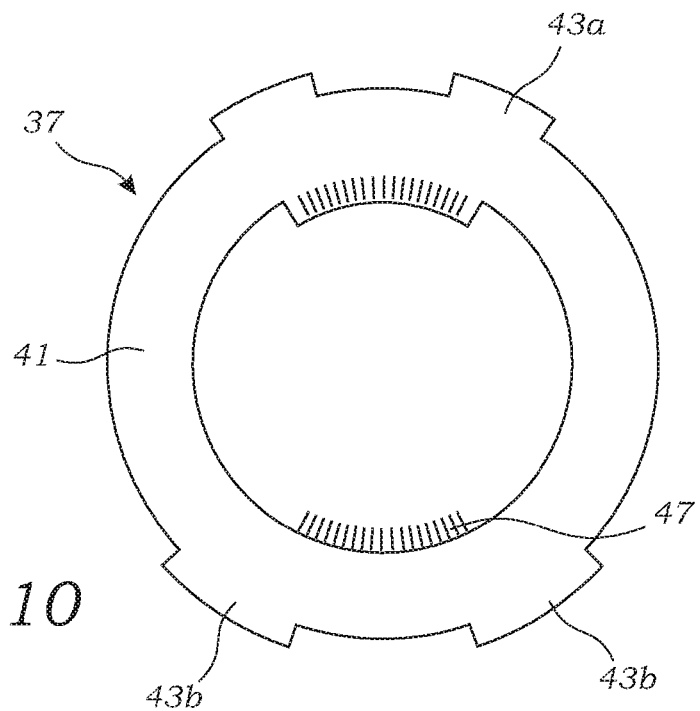
FIG. 10 is a bottom plan view of the mounting plate of the light and mount assembly.
Figure 11:
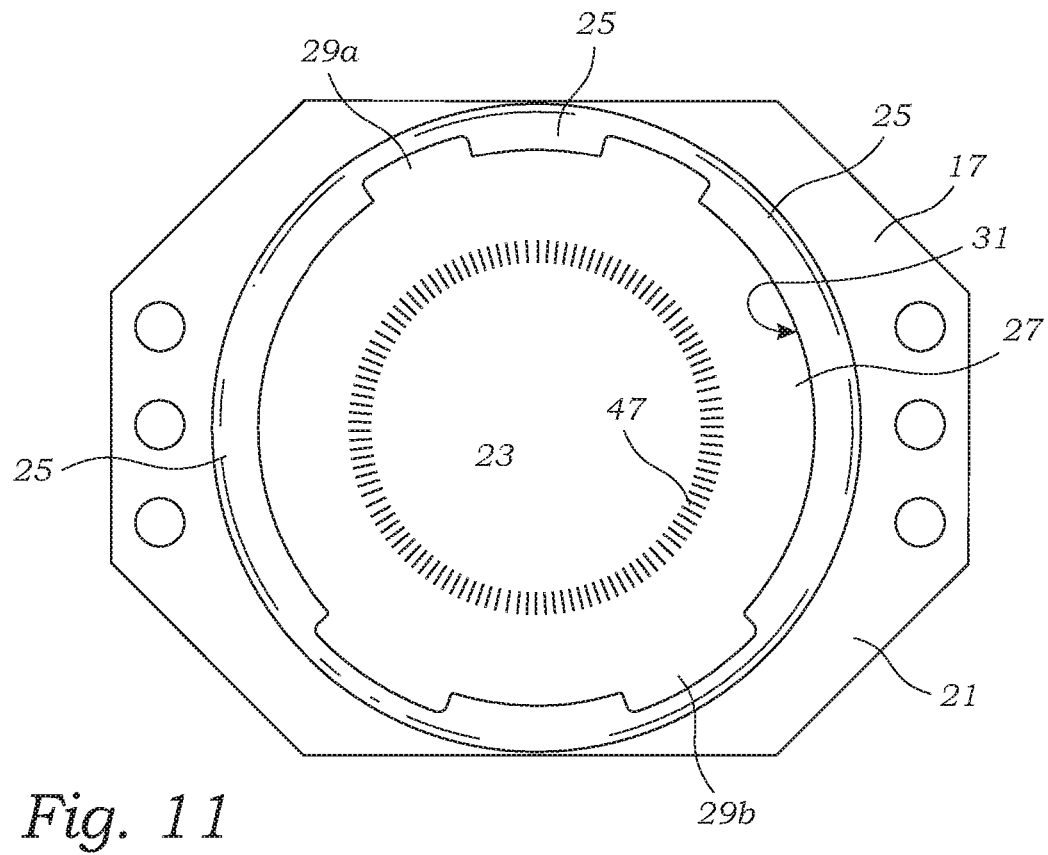
FIG. 11 is a top plan view of the base plate of the light and mount assembly.
Figure 12:
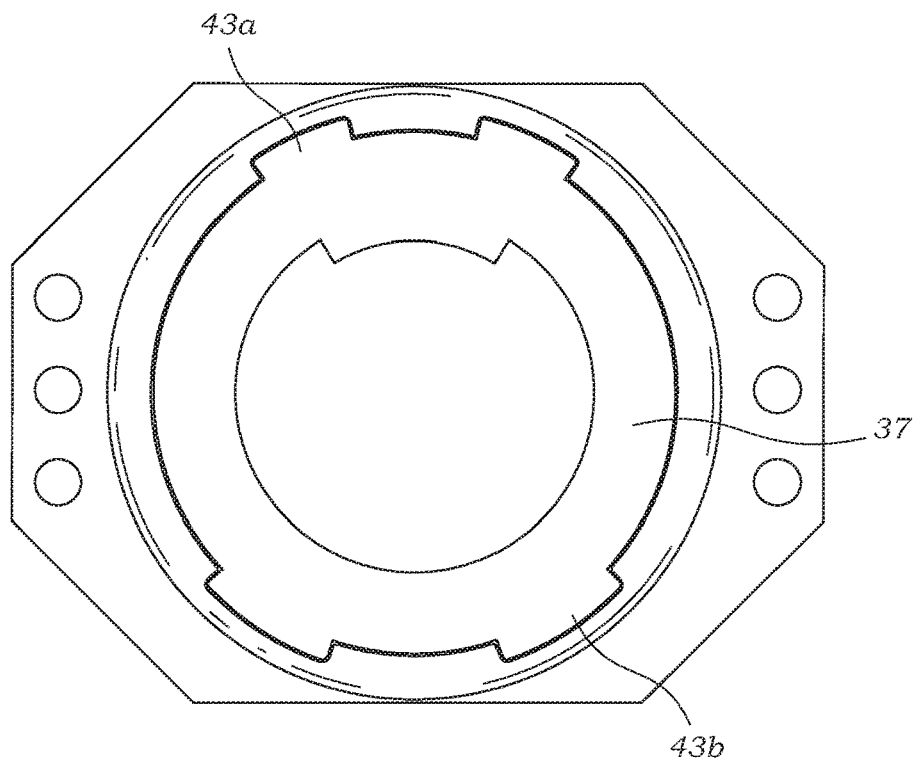
FIG. 12 is a top plan view of the base plate and mounting plate of the light and mount assembly with the light removed.
Figure 13:
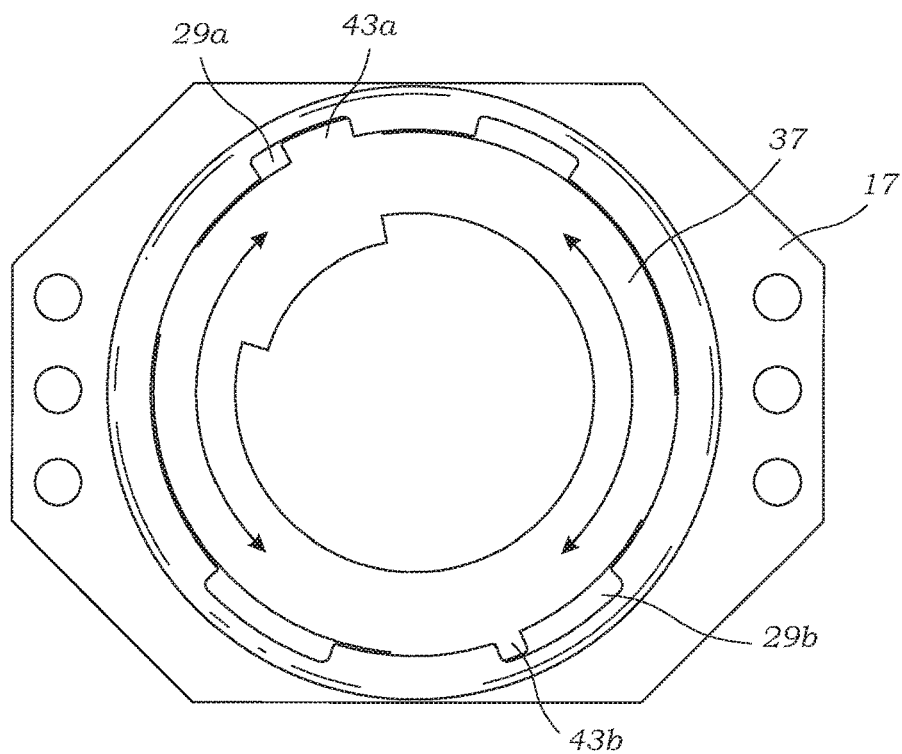
FIG. 13 is a top plan view of the base plate and mounting plate illustrated in FIG. 12 wherein the mounting plate has been rotated.

The light 5 is affixed to the top of the mounting plate 37 by various constructions as can be determined by those skilled in the art. However, as best illustrated in FIG. 2, preferably the light 5 is pivotally attached to the mounting plate 37 by a hinge assembly 51. In a preferred hinge assembly illustrated, the mounting plate 41 includes a top which has a U-shaped construction including upwardly extending sides 53 which forms a central channel 55. Meanwhile, the light's housing 9 includes a projection 65 which extends downwardly into the central channel 55. In addition, the hinge assembly 51 includes a shaft which extends from one side 53 of the U-shaped member to the other side 53 of the U-shaped member through a hole 67 formed in the housing's projection. In a preferred embodiment, the shaft 57 is a simple bolt 57 and nut 59 combination in which the bolt extends through holes 61 formed in the U-shaped member's sides 53 and a hole 67 formed in the light's housing's projection 65. As best illustrated in FIGS. 8 and 9, the light 5 is capable of pivoting about the shaft 57 which defines an axis of rotation 69. Preferably, the light's housing's projection includes teeth 47 which frictionally engage the mounting plate's top surface so as to prevent vibration or light bumps from pivoting the light when not desired.

The light and mount assembly further includes a base plate 17 which affixes to underlying objects, such as the helmet 71 illustrated in the figures. The base plate 17 includes a bottom surface 19 and a top surface 21. The base plate's bottom surface 19 is preferably shaped to provide substantial surface area for engaging an underlying object. For example, as illustrated in the figures, a preferred mounting plate has a slight curvature so as to engage the slight curvature of a helmet 71. The mounting plate's bottom may be affixed to an object utilizing various fasteners. However, in the preferred embodiment illustrated in the figures, the mounting plate 37 is affixed to an object utilizing a dual sided adhesive pad 50 which possesses adhesive on both sides of the thin foam pad.

The base plate's top 21 has a cavity 23. Moreover, the mounting plate's top extends partially over the cavity 23 to form a rim 25. The base plate's rim 25 is circular so as to form an opening 27 which is circular except for having two or more indents 29 sized for receiving the mounting plate's flanges 43. The rim 25 is positioned above the bottom of the cavity 23 so as to form a space 31 between the bottom of the rim 25 and the bottom of the cavity 23. The diameter of the base plate's circular opening 27 is substantially the same as the diameter of the base plate's round bottom 41, but sufficiently large to accept the mounting plate's bottom through the base plate's circular opening 27.

The mounting plate's flanges 43 are sized and positioned so as to be "keyed" to be received within the base plate's indents 29. In the preferred embodiment illustrated in the figures, the mounting plate includes four flanges 43 including two small flanges 43a and two large flanges 43b. Similarly, the base plate's rim has four indents 29 including two small indents 29a and two large indents 29b. The mounting plate's flanges and base plate's indents are sized and positioned so that the mounting plate's small flanges 43a can pass through the base plate's small indents 29a and the mounting plate's large flanges 43b can pass through the base plate's large indents 29b when the mounting plate's bottom 41 is inserted into the base plate's circular opening 27.

Figure 4:
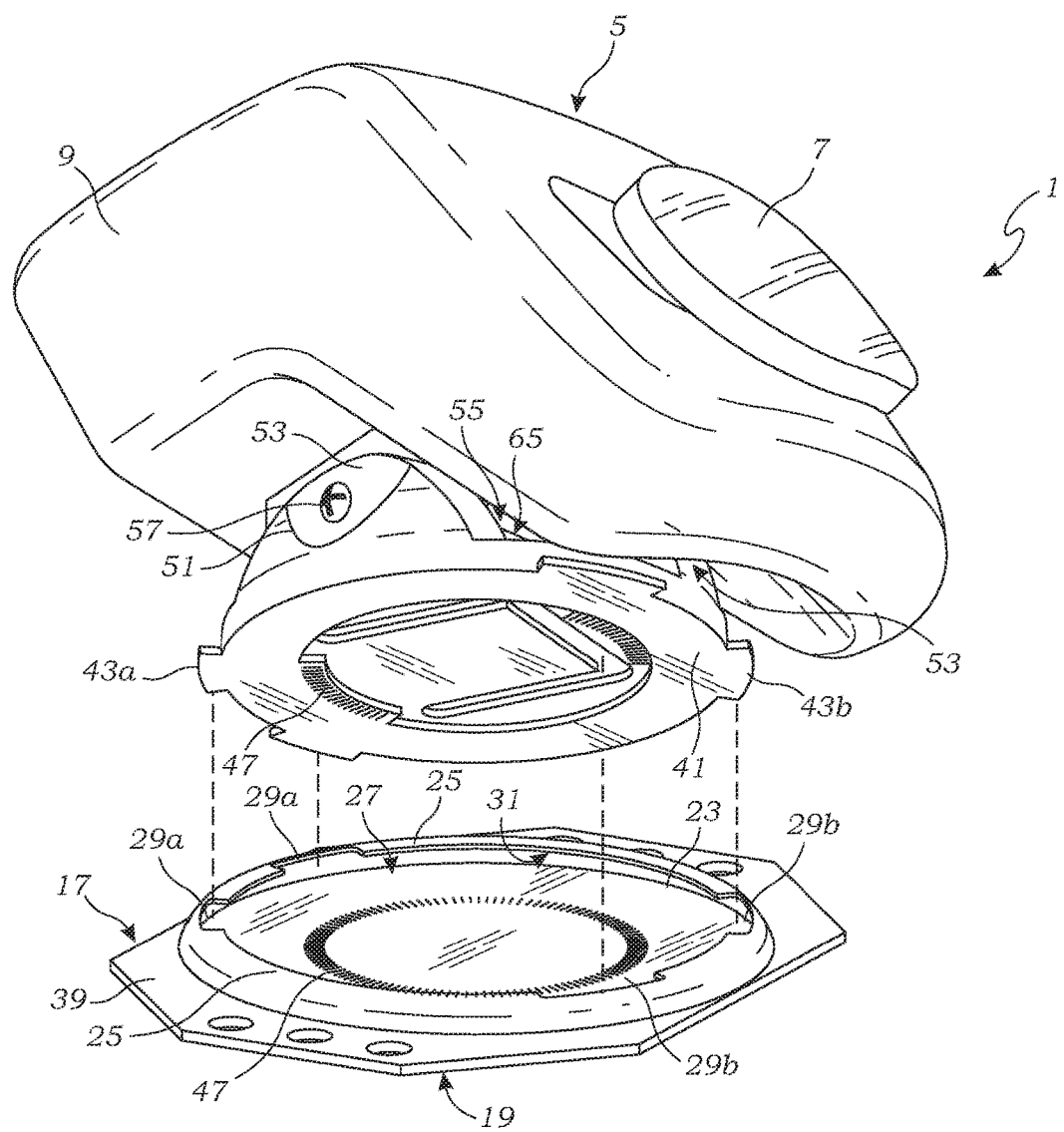
FIG. 4 is a left front side partially exploded perspective view of the light and mount assembly.
Figure 5:
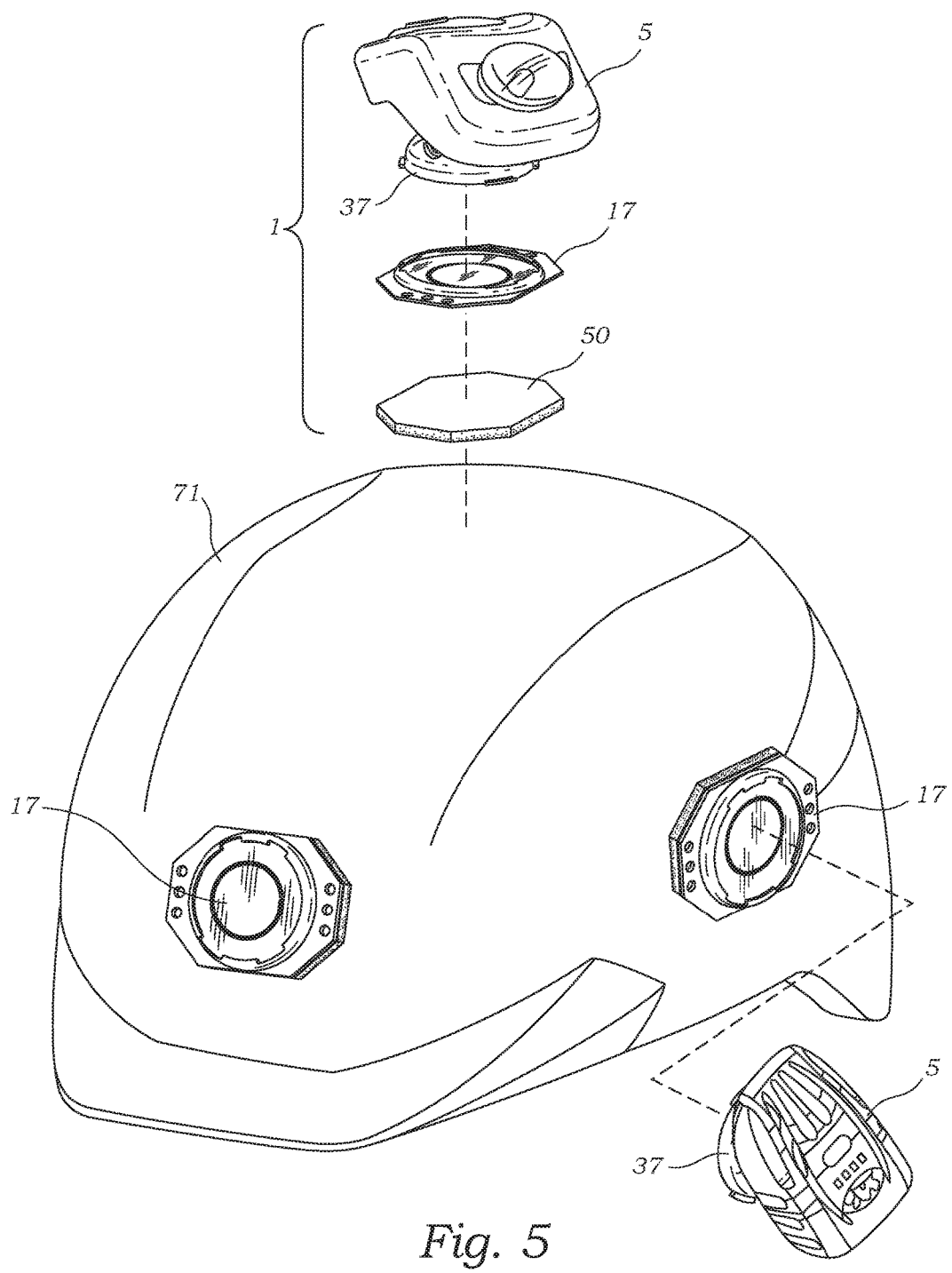
FIG. 5 is an exploded perspective view illustrating two lights being affixed to two of three mounts affixed to a helmet.
Figure 6:
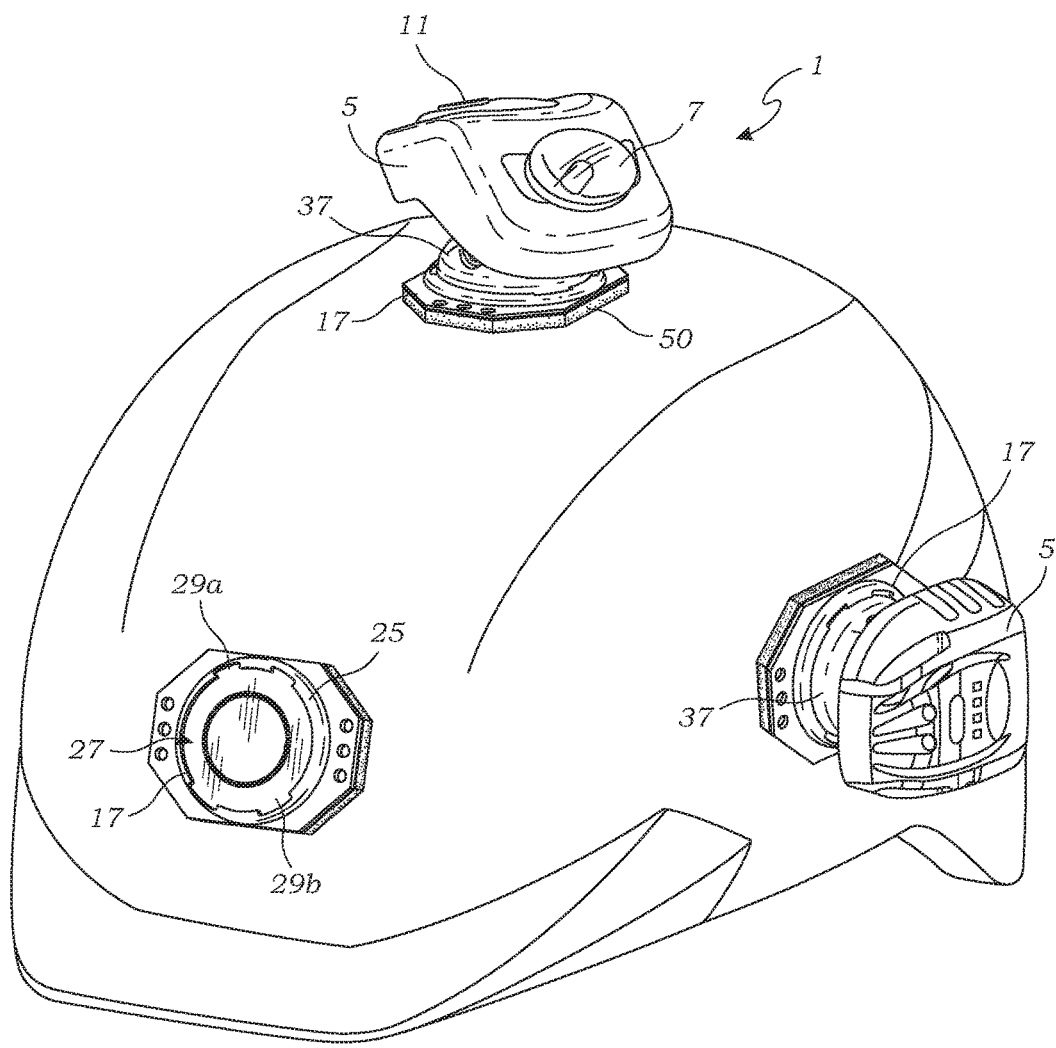
FIG. 6 is a perspective view illustrating a helmet having three mounts for affixing two lights.
Figure 7:
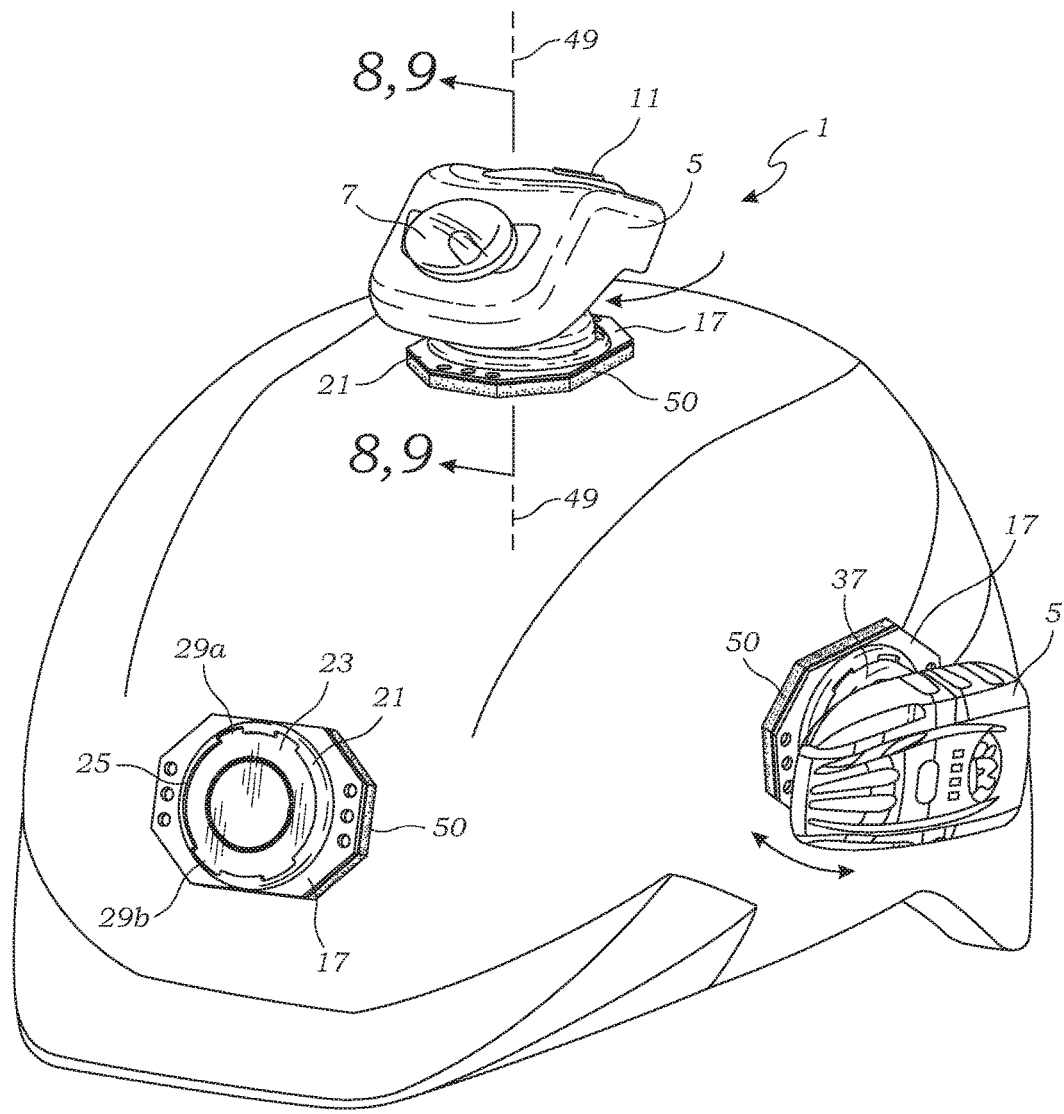
FIG. 7 is a perspective view illustrating the light and mount assemblies illustrated in FIG. 6 wherein one of the lights has been rotated.

As illustrated in FIGS. 2-7 and 10-13, to affix the mounting plate 37 to the base plate 17, the mounting plate's bottom 41 is inserted through the base plate's circular opening 27 with the flanges 43 aligned to pass through the indents 29. The space 31 between the base plate's rim 25 and bottom of the cavity 23 is sufficiently large to allow the flanges to travel into the cavity 23 below the rim 25. Thereafter, the mounting plate 37 can be rotated relative to the base plate 17 about an axis of rotation 49 (see FIG. 5) so that the flanges 43 are rotated to be below the rim 25. Thereafter, the mounting plate 37 can be rotated relative to the base plate 17 without disengaging the mounting plate from the base plate except for the one position where the flanges 43 align with the indents 29 so as to lock the mounting plate 37 to the base plate 17. As illustrated in FIG. 4, preferably the bottom of the mounting plate includes deformable teeth which engage deformable teeth 47 formed on the top of the base plate so as to restrict rotational movement of the light and mounting plate relative to the base plate unless a sufficient predetermined manual force is exerted to rotate the mounting plate 37.

Advantageously, the light 5 and mounting plate 37 can be very quickly and very easily affixed to the base plate 17 by simply inserting the mounting plate's bottom 41 into the base plate's opening 27, and rotating the mounting plate 37 slightly so that the flanges 43 are below the plate's rim 25. Removal of the light 5 and mounting plate 37 can be affected by quickly and easily reversing these steps.

The light and mount assembly 1 also enables the light 5 to be affixed to an object, such as a helmet 71, and rotated about two axis wherein one axis is 90° relative to the other axis. More specifically, the light 5 and mounting plate 37 can be rotated about a first axis of rotation 49 relative to the base plate 17. In addition, the light 5 can be rotated about a second axis of rotation 69 so as to pivot the light 5 relative to the mounting plate 37 (see FIGS. 8 and 9).

While several particular forms of the invention have been illustrated and described, it will be apparent that various modifications can be made without departing from the spirit and scope of the invention. Therefore, it is not intended that the invention be limited except for the following claims. Having described my invention in such terms so as to enable persons skilled in the art to understand the invention, recreate the invention and practice it, and having presently identified the presently preferred embodiments thereof,

I claim:

1. A light and mount assembly comprising:
   a base plate having a top and a bottom, said base plate including a cavity which is formed into said base plate's top, said base plate's top also including a circular rim which circumnavigates and extends partially over said cavity to form a circular opening, said rim having at least two indents which project radially outward into said rim's circular opening;
   a mounting plate having a top and a bottom, said mounting plate's bottom being round and having a diameter substantially the same as said base plate's circular opening and capable of projecting into said base plate's circular opening, and said mounting plate's bottom having at least two flanges which project radially outward from said mounting plate round bottom;
   said base plate and mounting plate being engageable and disengageable to one another wherein said mounting plate's flanges and said base plate's indents are "keyed" to each other so as to permit said base plate and mounting plate to convert from a disengaged condition to an engaged condition wherein said flanges are sized and positioned to as to be inserted into and travel through said indents in only one position relative to each other, and wherein said base plate cavity is sufficiently large to accept said mounting plate flanges to enter into said cavity interior of the base plate's circular rim, and once said flanges are within said base plate cavity interior of the base plate's circular rim, said mounting plate is rotatable 360° relative to said base plate to rotate said flanges below said base plate's rim so as to lock said base plate to said mounting plate, and said base plate and mounting plate disengagable only after said mounting plate has been rotated relative to said base plate so as to align said flanges to said indents in only said one position; and
   a light source affixed to said mounting plate.

2. The light and mount assembly of claim 1 wherein said rotation of said mounting plate relative to said base plate defines a first axis of rotation, and said mounting plate includes a hinged assembly for affixing said light source to said mounting plate, said hinged assembly allowing said light source to be rotatable about a second axis of rotation that is aligned 180° relative to said first axis of rotation.

3. The light and mount assembly of claim 1 wherein said at least two indents includes a first indent which is larger than a second indent, and said at least two flanges includes a first flange which is larger than a second flange, and first flange is aligned to insert into said first indent and said second flange is aligned to insert into said second indent so as to permit said base plate and mounting plate to convert from a disengaged condition to an engaged condition wherein said flanges are sized and positioned to as to be inserted into and travel through said indents in only one position relative to each other to create said "keyed" engagement and disengagement.

4. The light and mount assembly of claim 1 wherein said at least two flanges includes a first flange and a second flange, and said at least two indents includes a first indent positioned to receive said first flange and a second indent positioned to receive said second flange, and wherein said indents are not positioned at uniform increments about said base plate's circular rim, and said flanges are not positioned at uniform increments about said mounting plate's bottom so as to permit said base plate and mounting plate to convert from a disengaged condition to an engaged condition wherein said flanges are positioned to as to be inserted into and travel through said indents in only one position relative to each other to create said "keyed" engagement and disengagement.

* * * * *